United States Patent
Baur et al.

[11] Patent Number: 5,993,179
[45] Date of Patent: Nov. 30, 1999

[54] HOUSING BLOCK WITH A PISTON PUMP FOR A BRAKE SYSTEM

[75] Inventors: Gerd Baur, Rettenberg-Friedorf; Andreas Rekofsky, Kempten, both of Germany

[73] Assignee: Robert Bosch GmbH, Stuttgart, Germany

[21] Appl. No.: 08/698,993

[22] Filed: Aug. 16, 1996

[30] Foreign Application Priority Data

Aug. 16, 1995 [DE] Germany .................. 195 30 012

[51] Int. Cl.⁶ ........................................ F04B 39/10
[52] U.S. Cl. .................. 417/554; 92/128; 417/545; 417/554; 29/888.02; 29/525
[58] Field of Search ............. 92/128; 29/888.02, 29/888.061, 525; 417/545, 552, 559

[56] References Cited

U.S. PATENT DOCUMENTS

| | | |
|---|---|---|
| 5,333,836 | 8/1994 | Fukuyo et al. ........... 251/129.15 |
| 5,540,570 | 7/1996 | Schuller et al. ........... 417/545 |
| 5,653,249 | 8/1997 | Reinhartz et al. ........... 137/1 |

FOREIGN PATENT DOCUMENTS

| WO 96/28661 | 9/1966 | WIPO . |
| WO9419128 | 9/1994 | WIPO . |

Primary Examiner—Timothy S. Thorpe
Assistant Examiner—Ehud Gartenberg
Attorney, Agent, or Firm—Edwin E. Greigg; Ronald E. Greigg

[57] ABSTRACT

The invention relates to a housing block into which a piston pump is inserted. For sealing off and fixing a cylinder of the piston pump in the housing block, the cylinder is provided with a radially outward-protruding annular shoulder, which when the cylinder is press-fitted in the housing block displaces material of the housing block and deforms the housing block plastically radially inward until material rests sealingly on the cylinder and fixes the cylinder in the housing block. The invention makes it possible to accomplish securing and sealing in one operation in an economical way, without requiring additional securing means and economizing on one high-pressure-proof sealing ring.

4 Claims, 4 Drawing Sheets

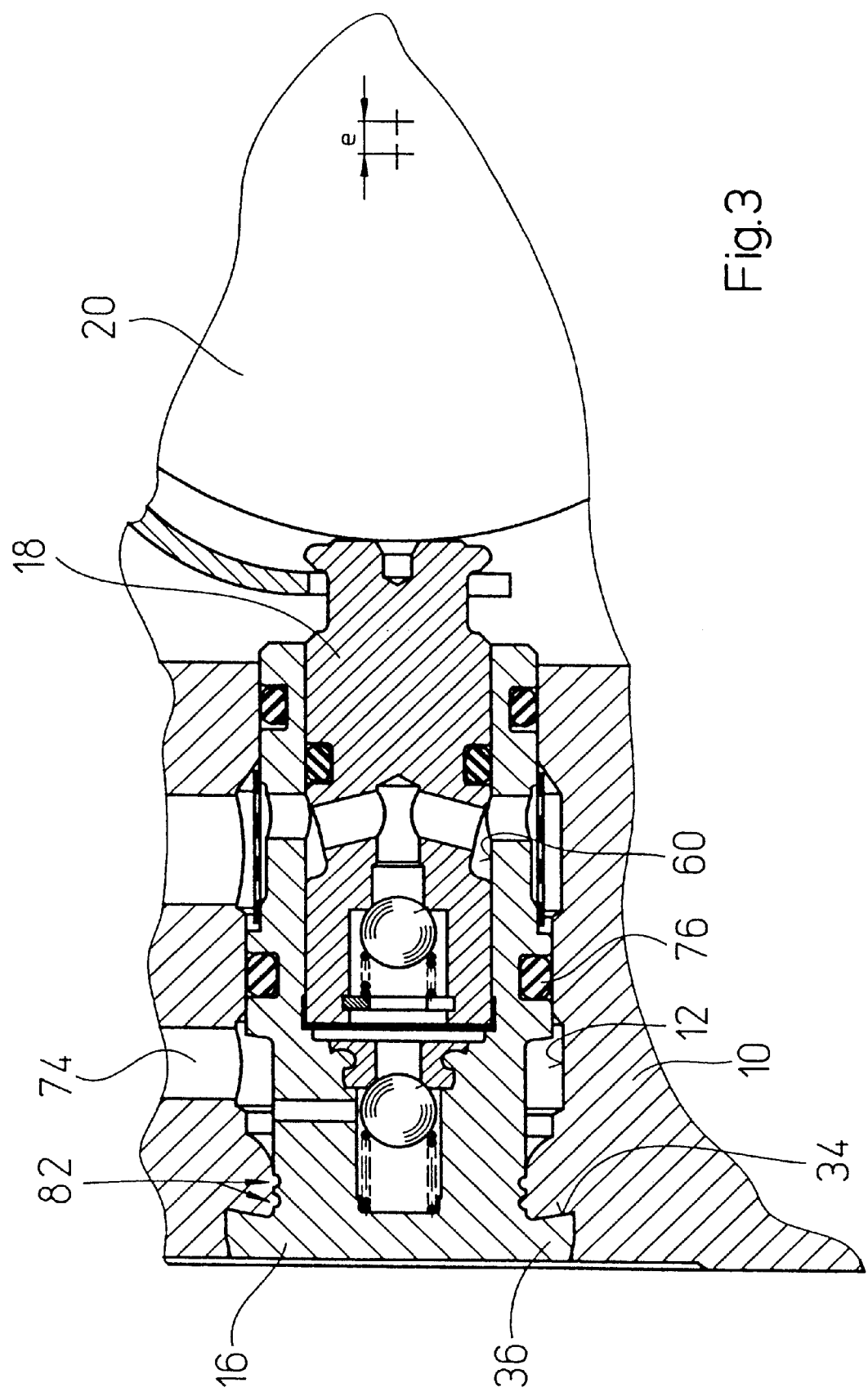

HOUSING BLOCK WITH A PISTON PUMP FOR A BRAKE SYSTEM

BACKGROUND OF THE INVENTION

The invention relates to a hydraulic housing block with a piston pump, which is intended for instance for use in an anti-lock motor vehicle brake system.

One such hydraulic block is known from German Patent Disclosure DE 43 29 211 C1, U.S. application, Ser. No. 08/297,078, filed Aug. 29, 1994 now U.S. Pat. No. 5,540,520. A cylinder of a piston pump is inserted into a receiving bore of the known housing block; a piston is displaceably supported in the cylinder and is drivable, for instance by an eccentric driven to rotate, so as to execute a reciprocating stroke motion. The cylinder is inserted so deeply into the receiving bore that a cylinder flange rests on an annular step of the receiving bore. To secure the cylinder in the receiving bore, the housing block is caulked; in other words, material of the housing block is plastically deformed, so that it embraces the cylinder flange and thereby fixes the cylinder in the receiving bore.

OBJECT AND SUMMARY OF THE INVENTION

In the housing block according to the invention the cylinder is inserted into the receiving bore of the housing block until a radially outward-protruding annular shoulder of the cylinder comes to rest on the housing block. The annular shoulder may be disposed at any point in the longitudinal direction of the cylinder. Preferably, it is located on an outlet-side end of the cylinder, that is, on the compression side of the piston pump. Once the annular shoulder is resting on the housing block, the cylinder is pressed into the housing block, and the annular shoulder displaces material of the housing block or in other words plastically deforms it. The material flows radially inward. The cylinder is pressed in so deeply that the plastically deformed material of the housing block comes to rest on an outer circumferential face of the cylinder and seals off the cylinder relative to the housing block and fixes it in the housing block. Because of the disposition of the annular shoulder on the compression side of the piston pump, a high-pressure sealing element becomes unnecessary. The housing block, or in general the part whose material is plastically deformed, is made of softer material than the part that displaces the material.

The invention has the advantage of a simple fixation and sealing of the cylinder in the housing block in one operation; additional securing elements are not required, and a high-pressure-proof seal is dispensed with. Additionally, it has the advantage of extensive protection against disassembly of the piston pump, which would cause a total failure of a brake system.

The securing of the cylinder in the housing block is accomplished, at least in the insertion direction, by positive engagement of the cylinder into the housing block. To attain positive engagement in the opposite direction as well, a groove is provided in the cylinder and material of the housing block is plastically displaced into this groove during the press-fitting of the cylinder.

An annular shoulder is provided on the housing block, so that material of the cylinder is plastically displaced, or in this case deformed radially outward, in order to fix and seal off the cylinder in the housing block. In this embodiment of the invention, a groove is provided in the receiving bore of the housing block into which material of the cylinder can be plastically displaced in order to attain an effective positive engagement in both directions.

By means of encompassing sealing grooves, the sealing between the cylinder and the housing block is improved by increasing the number of sealing points.

Because the surfaces on the outer circumference of the cylinder are embodied as larger than those faces on which fluid under pressure exerts a contrary force, at least during a working stroke of the piston pump, fluid under pressure exerts a force in the insertion direction of the cylinder. During the working stroke of the piston pump, a resultant force acts upon the cylinder that acts counter to a force caused by the piston motion and exerted upon the cylinder by the fluid pumped in the process. That is, depending on the size of the aforementioned cylinder faces, the force transmitted to the cylinder during the working stroke of the piston is either partially or fully or overcompensated for, so that the requisite securing forces of the cylinder in the housing block are small.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 is a longitudinal section through a second exemplary embodiment of the invention.

DESCRIPTION OF THE PREFERRED EMBODIMENTS

Figure 1:
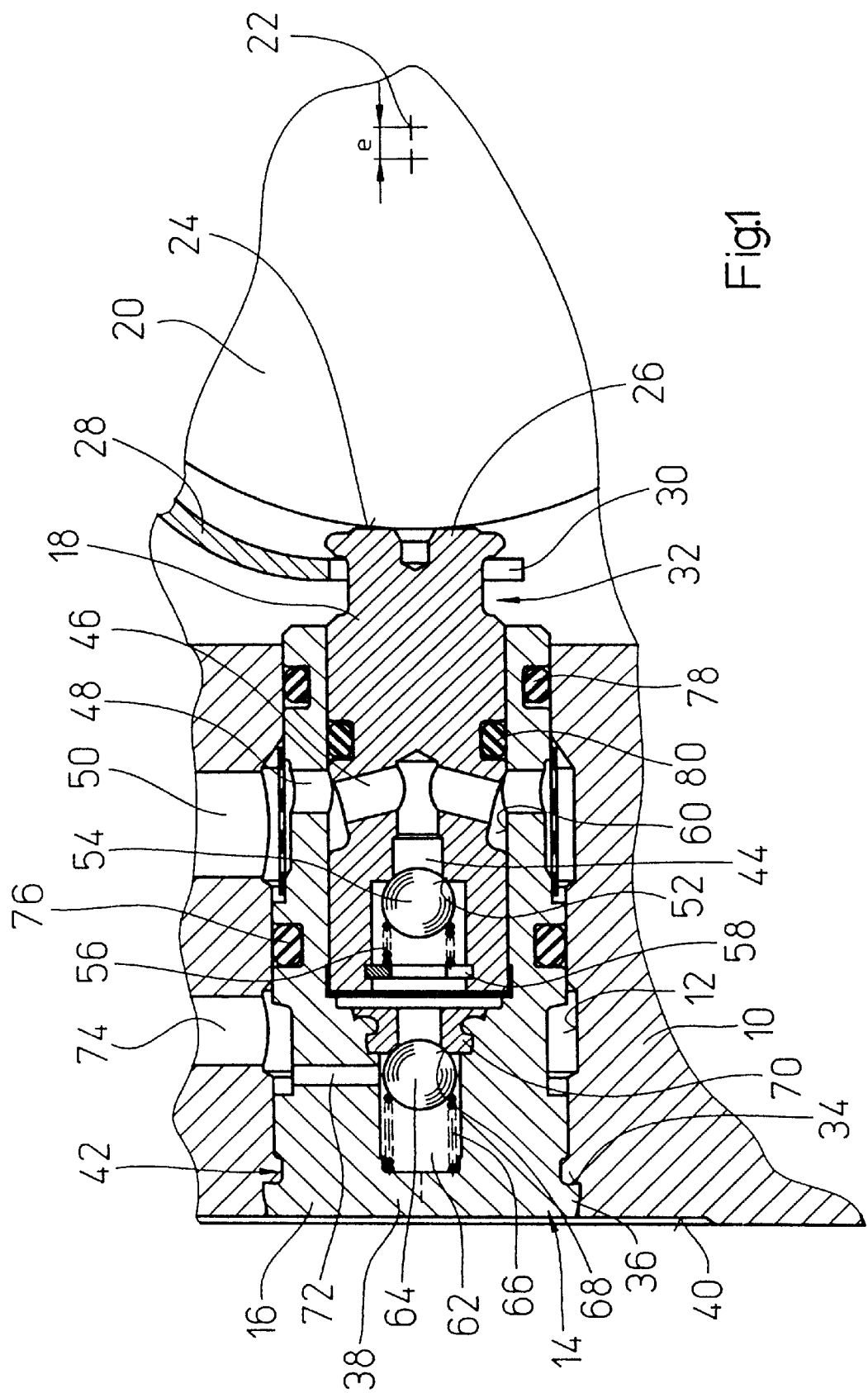
FIG. 1 is a longitudinal section through a housing block according to the invention with a piston pump.

FIG. 1 shows a section through a region of a housing block 10 in which a piston pump is accommodated. The housing block 10 is intended for controlling a vehicle brake system with anti-lock brakes, optionally combined with traction control. The piston pump serves to pump brake fluid.

The housing block 10 has a receiving bore 12 with an assembly mouth 14 that receives a cylinder 16 of the piston pump. A piston 18 is displaceably supported in the cylinder 16. The reciprocating drive of the piston 18 is effected by means of an eccentric cam 20, which is rotatably supported in the housing block 10 with an eccentricity e about a rotation axis 22 and which presses against an end face 24 on a head end 26 of the piston 18, which end protrudes from the cylinder 16 on a side remote from the assembly mouth 14 of the receiving bore 12. A spring clip 28 includes a split end 30 which engages a groove 32 on the head end 26 of the piston 18, and holds the end face 24 of the piston in contact against a circumferential face of the eccentric cam 20.

To secure the cylinder 16 in the receiving bore 12, the cylinder 16 has a radially outwardprotruding annular shoulder 34, which is formed on a cylinder flange 36. The cylinder flange 36 is located on a closed cylinder end 38 that is located in the assembly mouth 14 of the receiving bore 12.

Figure 2C:
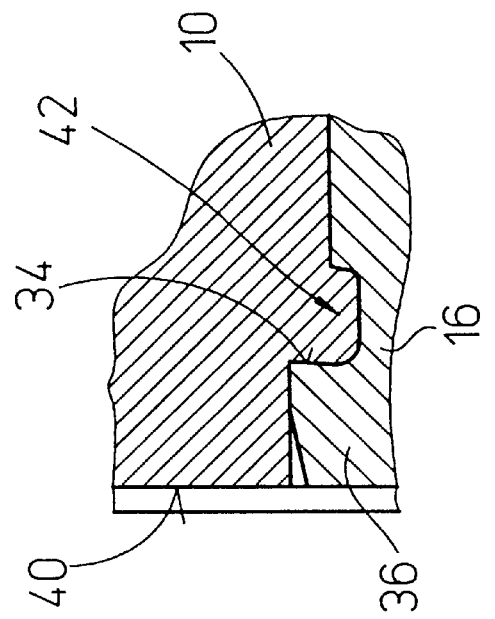
FIGS. 2a–c show the deformation of material as a cylinder is press-fitted into the housing block.
Figure 2B:
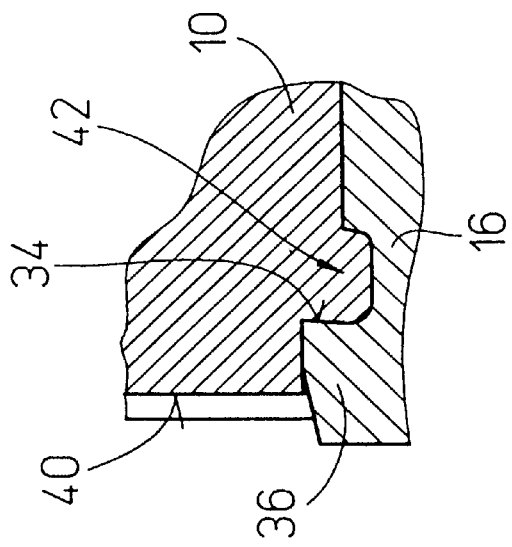
Figure 2A:
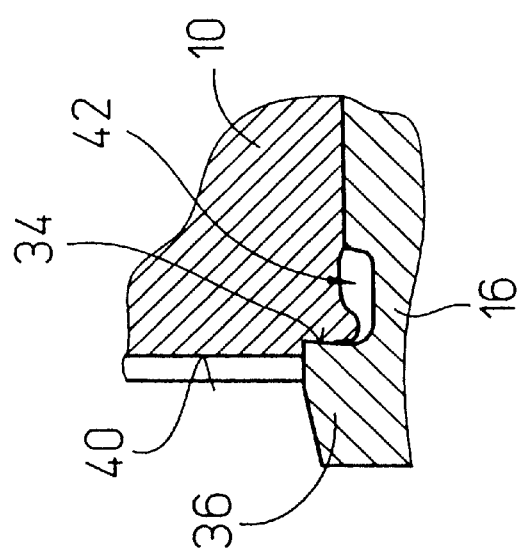

The securing of the cylinder 16 in the receiving bore 12 of the housing block 10 is shown in FIGS. 2a–c, which show phases for a detail of FIG. 1 in the region of the cylinder flange 36. The cylinder 16 is first introduced into the receiving bore 12 until its annular shoulder 34 comes to rest on an outer face 40 of the housing block 10. Next, the cylinder 16 is press-fitted into the receiving bore 12; the annular shoulder 34 displaces material of the housing block 10 and plastically deforms it radially inward (FIG. 2a). In the process, the deformed material enters an encompassing groove 42 of the cylinder 16 that is located on the annular shoulder 34 of the cylinder flange 36. The cylinder 16 is press-fitted in until material of the housing block 10 entirely fills the groove 42 of the cylinder 16 (FIG. 2b) and this continues until the cylinder 16 is located flatly in a plane with the outer face 40 of the housing block 10 (FIG. 3c and FIG. 1). The material to be deformed of the housing block 10 has a Rockwell hardness HRB or HRC that is less, by approximately 20 units, than that of the deforming cylinder 16 in the region of its annular shoulder 34.

The plastically deformed material of the housing block 10 engages the groove 42 of the cylinder 16 and in this way holds the cylinder 16 positively in the housing block 10. As a result of the press-fitting of the cylinder 16 beyond the position in which material of the housing block 10 entirely fills up the groove 42 of the cylinder 16, the plastically deformed material of the housing block 10 rests with pressure on the bottom and sides of the groove 42 of the cylinder 16 after the press-fitting has ended and the press-fitting force no longer acts on the cylinder 16, even if the material of the housing block 10 and cylinder 16 exhibit elasticity. The cylinder 16 is fixed in the housing block by means of the material of the housing block 10 engaging the groove 42 of the cylinder. The plastically deformed material of the housing block 10, which rests under pressure on the bottom of the groove 42 of the cylinder 16, also seals off the cylinder 16 from the housing block 10.

An inlet valve is integrated into the piston 18: the piston 18 has an axial stepped longitudinal bore 44, which discharges on its end located in the cylinder 16 and is embodied as a blind bore extending to approximately the middle of the piston 18. Via transverse bores 46, 48 in the piston 18 and in the cylinder 16, respectively, the longitudinal bore 44 cooperates with an inlet conduit 50 of the housing block 10. A conical valve seat face 52 is formed on an annular step of the longitudinal bore 44, and a ball 54, as the valve closing body, is pressed against this valve seat face by a helical compression spring 56. The helical compression spring 56 is supported against a Seeger ring 58, which is inserted into a groove in the mouth of the longitudinal bore 44 of the piston 18.

In the extension of a cylinder bore 60 in which the piston 18 is displaceably supported, an outlet valve embodied as a check valve is located in a blind bore 62 that discharges into the cylinder bore 60. The outlet valve likewise has a ball 64 as its valve closing body, which is pressed by a helical compression spring 66 against a conical valve seat 68. The helical compression spring 66 is braced against a closed end of the blind bore 62. The valve seat face 62 is embodied on a valve seat body 70 that has a bore drilled through it and that is inserted into a step at the transition from the blind bore 62 to the cylinder bore 60. The valve seat body 70 is secured in the cylinder 16 by plastic deformation. The plastic deformation can be accomplished in a manner known per se using a working tool or by press-fitting in a manner described for the cylinder 16, as shown in the exemplary embodiment.

A transverse bore 72 of the cylinder 16 discharges into the blind bore 62 and communicates with an outlet conduit 74 of the housing block 10.

The sealing off of the cylinder 16 from the outside on the outlet and hence high-pressure side is effected, as described above, by plastic deformation of material of the housing block 10 into the groove 42 of the cylinder 16, against the bottom of which the material rests sealingly. A sealing ring is not necessary. The sealing off between the compression side and the suction side of the piston pump is effected by means of a sealing ring 76, which is inserted into a cylinder groove. A sealing ring 78 is likewise inserted into a cylinder groove on the low-pressure side. The piston 18 is also sealed off from the cylinder 16 by means of a sealing ring 80 inserted into a piston groove.

FIG. 3 shows a second exemplary embodiment of the invention, in which the plastic deformation region of a cylinder 16 with a housing block 10 is embodied differently from the first exemplary embodiment. Otherwise, the two exemplary embodiments match one another. To avoid repetition, reference is made to the description of the first exemplary embodiment. For corresponding components, the same reference numerals are used.

The cylinder 16 again has an annular shoulder 34 on its closed end 38, which shoulder is formed on a cylinder flange 36. The annular shoulder 34 protrudes radially outward beyond a rated diameter of the cylinder 16 or of a receiving bore 12 for the cylinder 16 in the housing block 10.

The annular shoulder 34 is not, however, adjoined by a groove; instead, the cylinder 16 tapers at the annular shoulder 34 to a diameter that is less than the rated diameter. The press-fitting of the cylinder 16 into the housing block 10 is done as in the first exemplary embodiment: Material of the housing block 10 is displaced by the annular shoulder 34 of the cylinder flange 36, causing plastic deformation, and flows radially inward so that even after the conclusion of the press-fitting operation it rests sealingly against the cylinder 16. The connection between the cylinder 16 and the housing block 10 effected by the deformation of material of the housing block 10 is accomplished by positive engagement in the insertion direction of the cylinder 16 and by frictional engagement in the opposite direction.

The sealing between the cylinder 16 and the housing block 10 at the plastic deformation point, or in other words, from the compression side of the piston pump to the surroundings, is effected to a smaller diameter than the sealing between the suction and pressure side effected by a sealing ring 76. Consequently, a resultant force acts in the press-fit direction upon the cylinder 16 when fluid on the pressure side, that is, in the outlet 74, is under pressure. This is the case at least during the working stroke of a piston 18 of the piston pump, or in other words when the piston 18 is pressed by the eccentric cam 20 into the cylinder bore 60. This resultant force acts counter to the force that the piston 18 exerts on the cylinder 16 during the working stroke, via the fluid pumped to the outlet 74. As a result, the requisite retention force for fixing the cylinder 16 in the housing block 10 is small. It is dependent on the design of the piston pump, especially the rated diameter of the cylinder 16; on the plastic deformation point diameter and the piston diameter; and on the fluid pressures.

To improve the sealing at the plastic deformation point, the cylinder 16 in the second exemplary embodiment of the invention has two encompassing sealing grooves 82 at the plastic deformation point, into which grooves material of the housing block 10 is deformed in the process of press-fitting the cylinder 16 into the housing block 10. This forms two additional sealing points, which improve the sealing. Such sealing grooves 82 may also be provided in the first exemplary embodiment of the invention, shown in FIG. 1.

Figure 4:
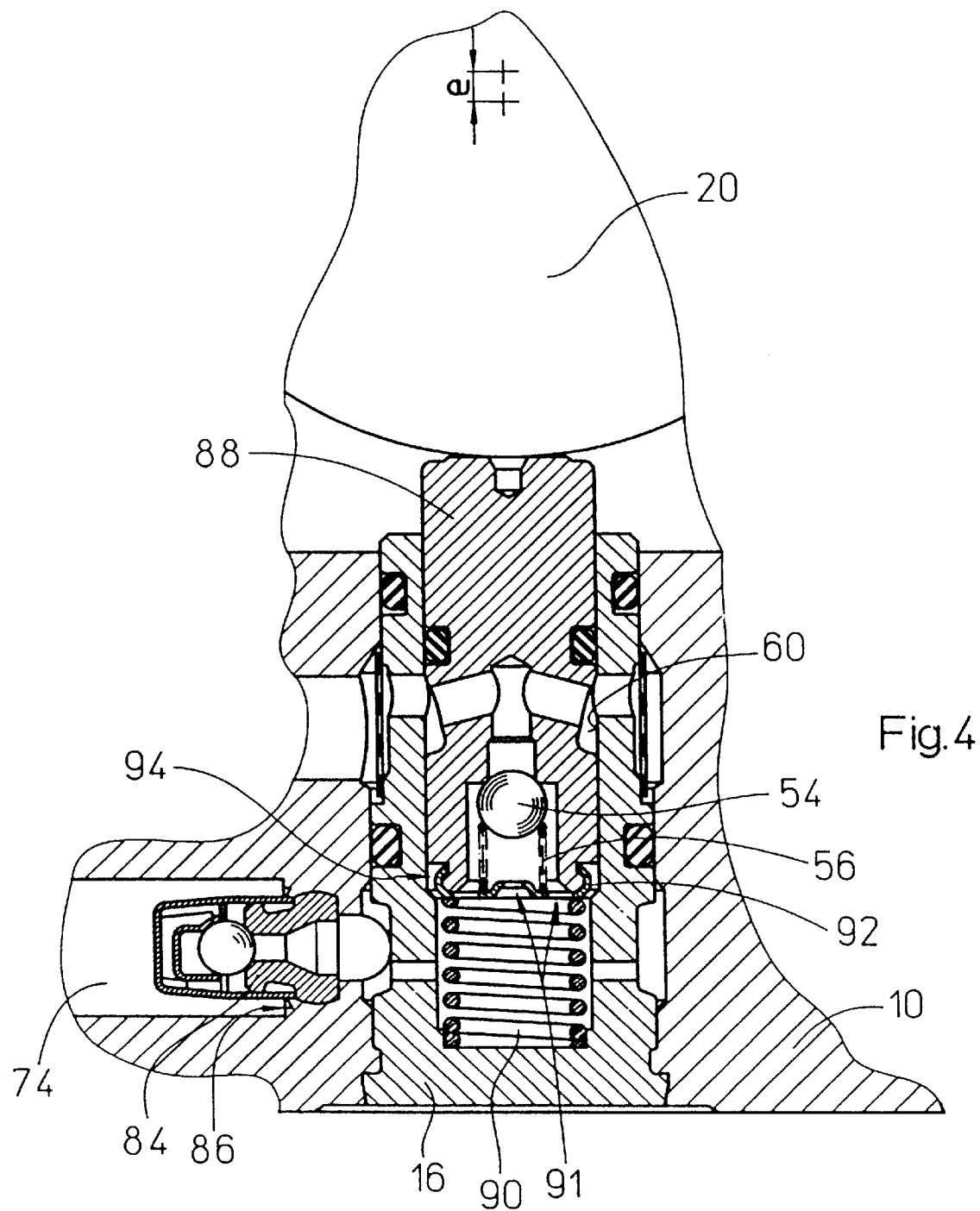
FIG. 4 shows a modification of the exemplary embodiment of FIG. 1.

FIG. 4 shows a modification of the first exemplary embodiment of the invention shown in FIG. 1; in the modification an outlet valve is accommodated in the housing block 10, rather than in the cylinder 16. To avoid repetition, only the changes from the first exemplary embodiment will be described below; for the remainder, reference is made to the description of the first exemplary embodiment. The same reference numerals are used for corresponding components.

The outlet valve, a check valve 84 known per se, is disposed in an outlet conduit 74 in the housing block 10, radially from the cylinder 16. It is secured by plastic deformation 86 of material of the housing block 10.

A piston 88 of the piston pump is held in contact with the eccentric cam 20 by a helical compression spring 90 inserted into a cylinder bore 60. Thus a hoop spring 28 as used in the first exemplary embodiment is omitted.

In the exemplary embodiment shown in FIG. 4, instead of a Seeger ring, for supporting a helical compression spring 56 for the inlet valve integrated with the piston 88, a support cap 92 with holes in it is mounted on a face end of the piston 88, and the helical compression spring 56 of the inlet valve closing body 54 is braced against it. The support cap 92 embraces the face end of the piston 88 and engages a groove 94. The piston 88 tapers on its face end; the outer diameter of the support cap 92 is smaller than the diameter of the cylinder bore 60. Hence the support cap 92 has radial clearance ("air") from the cylinder bore 60.

The foregoing relates to preferred exemplary embodiments of the invention, it being understood that other variants and embodiments thereof are possible within the spirit and scope of the invention, the latter being defined by the appended claims.

What is claimed and desired to be secured By Letters Patent of the United States is:

1. A housing block comprising a piston pump, said piston pump includes a cylinder which is inserted into a bore (12) of the housing block via a lower end of the bore, said cylinder includes a blind bore with a closed end (14) in which a piston is received, said piston is driven to execute a reciprocating stroke motion in said blind bore, the cylinder (16) on its closed end (14) has a radially outward-protruding annular shoulder (34) which has a diameter greater than said bore (12), the cylinder (16) is inserted in an insertion direction into the housing block (10) until the annular shoulder rests on an outer face of the housing block (10), the cylinder tapers to a diameter of the receiving bore (12); said cylinder includes an encompassing groove 42 in a circumferential face of the cylinder inwardly of said annular shoulder and that material of the housing block (10) is plastically displaced radially into said encompassing groove by a force on the annular shoulder (34) into a sealing contact with said circumferential face of the cylinder (16) by press-fitting the cylinder (16) into the receiving bore (12), said cylinder (16) includes a circumferential groove axially spaced from said encompassing groove (42), an elastic sealing ring (76) is inserted into said circumferential groove, said elastic sealing ring (76) has an outer diameter greater than the diameter of said encompassing groove (42) and fits tightly against said receiving bore (12) whereby a ringlike hollow space is located between said encompassing groove (42) and said elastic sealing ring (76), and a transverse bore (72) in said cylinder (16) opens into said hollow space for discharging fluid pumped by said piston (18).

2. The housing block in accordance with claim 1, in which the annular shoulder (34) is located between a pump outlet (72, 74) and an outlet-side end of the cylinder (16).

3. The housing block in accordance with claim 1, in which the cylinder (16) has encompassing seal grooves (82) into which material is displaced.

4. The housing block in accordance with claim 1, in which faces on an outer circumference of the cylinder (16) that are oriented toward the closed end (14) and acted upon by fluid that at least intermittently is under pressure are larger than oppositely oriented faces on the outer circumference of the cylinder (16) that are acted upon by fluid at the same pressure.

* * * * *